US012275169B2

(12) United States Patent
Henrichsen et al.

(10) Patent No.: US 12,275,169 B2
(45) Date of Patent: Apr. 15, 2025

(54) MOLD ADAPTED FOR PRODUCING AT LEAST A PART OF A WIND TURBINE BLADE

(71) Applicant: Siemens Gamesa Renewable Energy A/S, Brande (DK)

(72) Inventors: Soeren Randrup Daugaard Henrichsen, Vodskov (DK); Mogens Nielsen, Aalborg (DK)

(73) Assignee: Siemens Gamesa Renewable Energy A/S, Brande (DK)

( * ) Notice: Subject to any disclaimer, the term of this patent is extended or adjusted under 35 U.S.C. 154(b) by 1 day.

(21) Appl. No.: 17/340,634

(22) Filed: Jun. 7, 2021

(65) Prior Publication Data

US 2021/0387381 A1    Dec. 16, 2021

(30) Foreign Application Priority Data

Jun. 12, 2020 (EP) ..................... 20179658

(51) Int. Cl.
*B29C 33/30* (2006.01)
*B29L 31/08* (2006.01)

(52) U.S. Cl.
CPC .......... *B29C 33/301* (2013.01); *B29C 33/306* (2013.01); *B29L 2031/085* (2013.01)

(58) Field of Classification Search
CPC ... B29C 33/0011; B29C 33/02; B29C 33/301; B29C 33/306; B29C 33/307; B29L 2031/085; B29D 99/0028; Y02P 70/05; F03D 1/0675
See application file for complete search history.

(56) References Cited

U.S. PATENT DOCUMENTS

| 2011/0073237 | A1 | 3/2011 | Rajasingam | |
|---|---|---|---|---|
| 2012/0034094 | A1 | 2/2012 | Wansink | |
| 2012/0175807 | A1 | 7/2012 | Galdeano | |
| 2014/0327178 | A1* | 11/2014 | Davis | B29C 33/02 |
| | | | | 264/258 |
| 2019/0193304 | A1* | 6/2019 | Davis | B29C 33/308 |
| 2019/0381751 | A1* | 12/2019 | Matlack | B29C 70/342 |
| 2021/0046674 | A1* | 2/2021 | Lehmann Madsen | B29C 70/48 |

(Continued)

FOREIGN PATENT DOCUMENTS

| CN | 102029662 A | 4/2011 |
|---|---|---|
| CN | 203752382 U | 8/2014 |
| CN | 205086377 U | 3/2016 |

(Continued)

OTHER PUBLICATIONS

European Search Report and Written Opinion of the European Searching Authority issued Nov. 19, 2020 for Application No. 20179658.8.

*Primary Examiner* — John J DeRusso
*Assistant Examiner* — Victoria Bartlett
(74) *Attorney, Agent, or Firm* — Schmeiser, Olsen & Watts LLP

(57) ABSTRACT

Provided is a mold adapted for producing at least a part of a wind turbine blade, including a support and shell fixed to the support for accommodating blade building elements to be embedded in a resin matrix, wherein the shell includes at least one main body shell element and several diverse tip shell elements, which are exchangeably fixable to the support.

9 Claims, 3 Drawing Sheets

(56) References Cited

U.S. PATENT DOCUMENTS

2021/0231097 A1* 7/2021 De L.M. Arias ..... F03D 1/0675

FOREIGN PATENT DOCUMENTS

| CN | 109789609 A | 5/2019 |
|----|----|----|
| DE | 19833869 C1 | 3/2000 |
| DE | 102010049502 A1 | 5/2012 |
| DE | 102014001445 A1 | 8/2015 |
| EP | 2316629 A1 | 5/2011 |
| WO | 2012055395 A2 | 5/2012 |
| WO | WO 2013097854 A1 | 7/2013 |
| WO | WO 2013097859 A2 | 7/2013 |
| WO | WO 2018024306 A1 | 2/2018 |
| WO | 2019149885 A1 | 8/2019 |
| WO | WO 2019234050 A1 | 12/2019 |
| WO | WO 2020114565 A1 | 6/2020 |

* cited by examiner

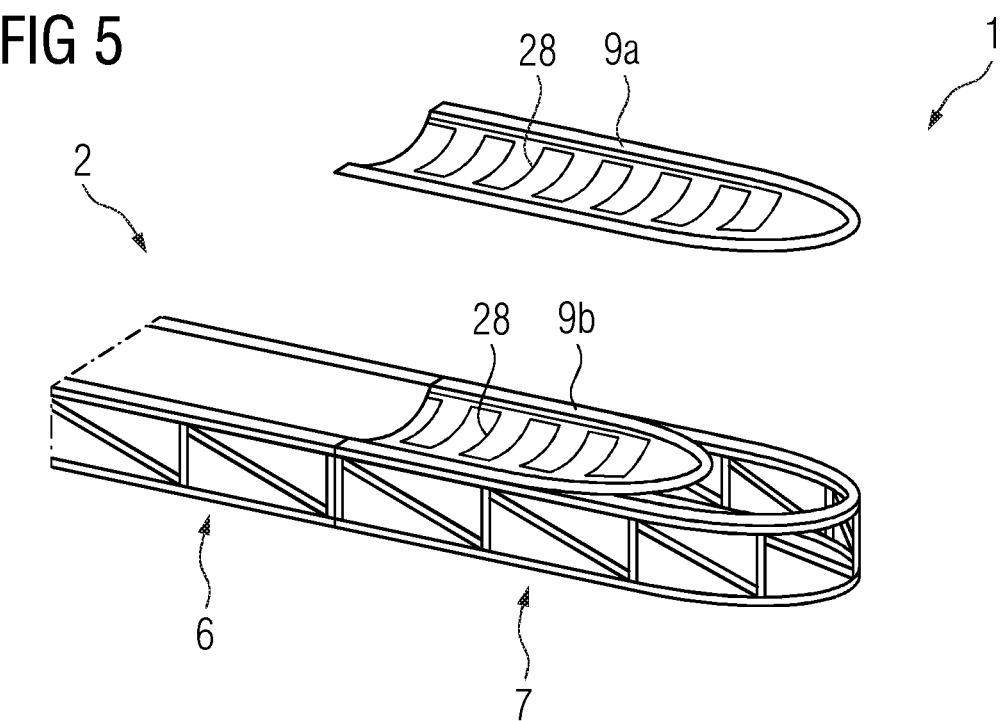
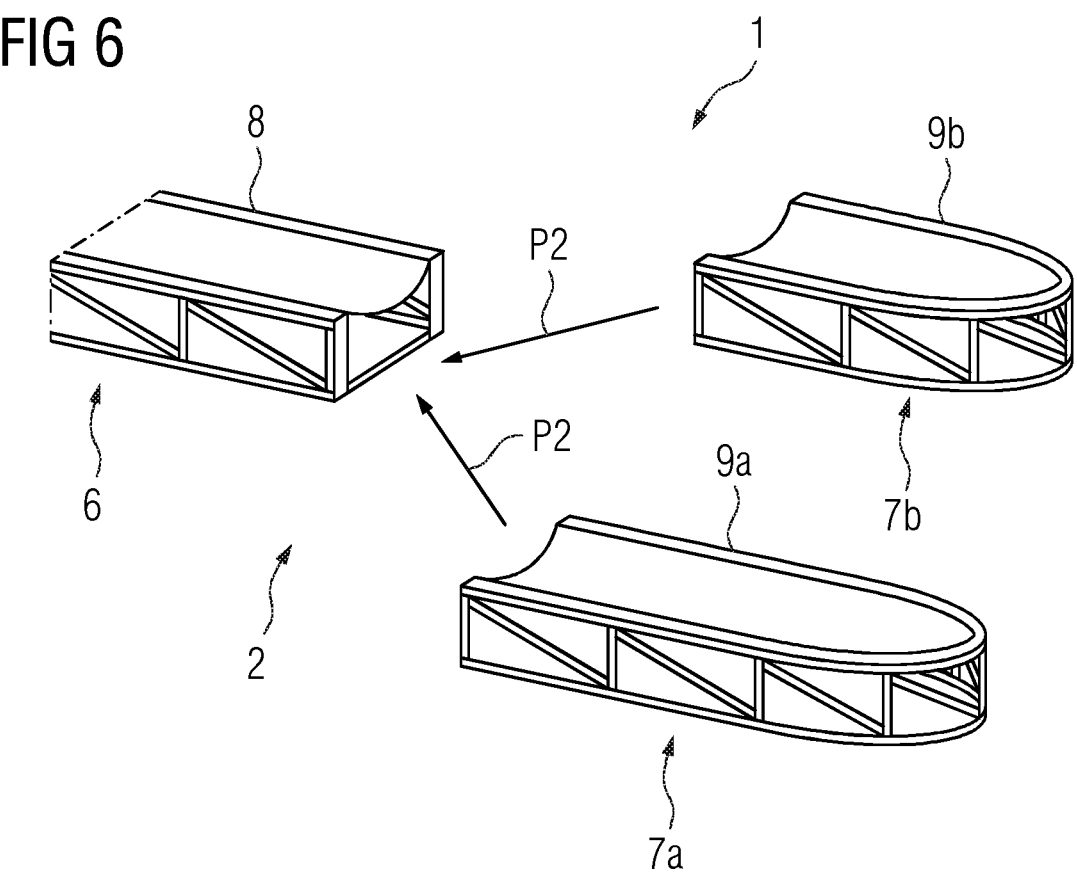

MOLD ADAPTED FOR PRODUCING AT LEAST A PART OF A WIND TURBINE BLADE

CROSS-REFERENCE TO RELATED APPLICATIONS

This application claims priority to European Application No. 20179658.8, having a filing date of Jun. 12, 2020, the entire contents of which are hereby incorporated by reference.

FIELD OF TECHNOLOGY

The following refers to a mold adapted for producing a wind turbine blade, comprising a support and shell means or shell fixed to the support for accommodating blade building elements to be embedded in a resin matrix.

BACKGROUND

Wind turbines are commonly known. They comprise a tower and a nacelle arranged on top of the tower. The nacelle comprises a hub, to which several, usually three rotor blades are attached. They interact with blowing wind making the hub rotate. The hub is coupled to an electric generator for producing electric power as commonly known.

A wind turbine respectively a rotor blade is a hollow construction with an elongated blade body, having a root section usually of cylindrical shape, by which it is attached to the hub. The root section is followed by the long blade body which changes its shape significantly from the root to the tip, as it merges from the cylindrical cross section at the root section to an airfoil cross-section, which then runs to the tip.

Such a blade is built of several blade building elements comprising among others fiber webs, wooden or polymer core elements or a web with spar caps etc., which building elements are embedded in a resin matrix. In a first alternative the blade is manufactured from two blade shells, i.e., an upper and a lower shell, which are separately manufactured in respective molds and which are attached to each other for finally building the blade. In a second alternative the blade is produced as a single piece in a single mold by a one-shot infiltration of the resin for embedding all blade building elements in a single step in the resin matrix. Embodiments of the invention refer to a mold adapted for producing both a half shell or, a complete one-shot blade.

For producing such a half shell or a one-piece wind turbine blade a mold is used, comprising a support and a mold shell means or shell fixed to the support. In this shell means or shell the respective blade building elements like the mentioned fiber webs or core elements etc. are arranged. When the whole setup is accommodated in the shell means or shell, a resin is infiltrated for embedding all these blade building elements, which resin is then cured and transformed to a very stable resin matrix embedding and fixing all the blade building elements, as commonly known. Depending on the item to be produced either only the components for producing a half shell are arranged in the shell means or shell, or the components for producing a complete blade are arranged in the shell means or shell.

The blade design especially in view of the length of the blade is usually specified at an early stage of the development of the turbine on a non-mature design applying certain design uncertainty factors. Based on this early frozen design the geometry of the mold is determined, which mold is then manufactured and defines the final blade geometry. However, during the long-lasting development the blade design may be adapted and may mature both with regard to its design and maybe site-specific loads. It may therefore be possible that the blade design changes especially regarding the blade length. This however entails problems with the previously determined mold concept, as the mold is already produced. The mold then needs to be cut and new mold pieces need to be built and inserted to provide a mold with the updated geometry. For this reason, the length of a blade is usually not changed.

SUMMARY

An aspect relates to an improved mold for producing a wind turbine blade.

For solving the problem, embodiments of the invention refers to a mold as described above, which is characterized in that the shell means or shell comprises at least one main body shell element and several diverse tip shell elements, which are exchangeably fixable to the support.

Embodiments of the invention propose a modular mold having a certain number of exchangeable tip shell elements, which have different geometries, and which can be fixed to the support. The tip section extends over several meters of the blade length. As usually the tip section is the crucial part of the blade, especially in regard of any changes in the overall blade length, this modular mold allows for easily changing the mold setup in case of any changes in the blade body design, which changes concern the tip section of the blade. The inventive mold may for example be designed based on the first determined blade geometry respectively tip section geometry using a respective tip shell element designated to this specific design. If during development of the blade geometry to a final geometry any changes occur, which concern the tip portion, the tip shell element may easily be changed to another tip shell element having a different geometry, which is designated to the final blade geometry. This allows for easily adapting the mold to a changed blade design.

In an embodiment, the tip shell elements vary at least in their lengths. This allows for easily changing the overall blade length, if from the first determined design to the finally determined design any changes in the blade lengths occur.

When the mold is set up, either for the first time or when a tip shell element is changed, it is necessary to provide a firm connection of the tip shell element to the adjacent main body shell element, which determines the geometry of the blade body adjacent to the tip section. Either there is only one main boy shell element, or a number of them being arranged on the support in line and connected to each other defining the geometry of the blade body. For connecting any of the several tip shell elements to the adjacent main body shell element, all tip shell elements have a standardized connection interface for connecting each tip shell element to the respective connection interface of the main body shell element. Each tip shell element can easily be changed and connected to the main body shell element using the same connection means or connector, as all connection interfaces of the shell elements and the main body shell element are standardized respectively the same.

In a first embodiment, each connection interface either of the tip shell elements or the main body shell element is a flange having several bores in which, when the flanges abut each other and the bores are aligned, a bolt is inserted for fixing the shell elements with a bolt-nut-connection. According to this embodiment, when the main body shell element and the respective tip shell element are arranged on the support, they are simply arranged to abut each other with their respective interface flanges. In an embodiment, when the respective elements, which are fixed against a movement to the side, are positioned in the longitudinal direction, their arrangement on the support is such that the bores and the respective flanges are automatically aligned, so that it is easy to insert the respective bolts, on which then respective screws are attached for firmly fixing the shell elements.

In a second alternative, each connection interface of the tip shell elements and the main body shell element is a slanted surface having several bores, in which, when the slanted surfaces abut each other and the bores are aligned, a bolt is inserted for fixing the shell elements with a bolt-nut-connection. In this embodiment, each shell element has a respective slanted surface, which surfaces are arranged above or overlapping each other, so that again the respective bores are, automatically, aligned when the shell elements are in their longitudinal position, so that the bolts can be inserted. While in the first alternative with vertical flanges, where the bolts are arranged horizontally, in the second embodiment with the slanted surfaces the bolts are arranged vertically. To avoid that the bolt heads, which are arranged at the inside of the shell elements, interfere with the outer shell surface, it is desirable that the bolt heads are sunken, so that an even outer body shell is obtained.

Also, regarding the setup of the support, several alternatives are feasible. According to a first alternative, the support comprises a support part for receiving a tip shell element, the length of which support part corresponds to the length of the longest tip shell element comprised within the modular mold system. According to this embodiment also the support is modular. It comprises one or more support parts adapted for receiving the one or the several main body shell elements. If several of the support parts supporting the main body shell elements are provided, they are arranged in line and firmly fixed to each other. Besides this or these support parts for the main body shell elements, the modular support comprises, according to this embodiment, one support part for receiving a tip shell element. This tip shell element is adapted to the length of the longest tip shell element, so that the longest tip shell element can be attached to this tip shell element support part, just like each of the other shorter tip shell elements. So, the single tip shell element support part is adapted to receive any of the diverse tip shell elements.

In an alternative, the support comprises, besides the at least one main body shell element support part for receiving the main body shell element(s), several diverse tip shell element support parts for receiving a tip shell element, which each tip shell element support part corresponding to the length of an assigned tip shell element, whereby the tip shell element support parts are exchangeably fixed to an adjacent main body shell element support part. According to this embodiment, just like the diverse tip shell elements, also a certain number of various tip shell element support parts are provided, which each tip shell element support part being assigned to a certain tip shell element. So, for changing the mold setup, not only the shell means or shell is changed, but also the support, as the respective tip shell element support part is fixed to the adjacent main body shell element support part, whereupon the respective tip shell element is fixed.

As in this embodiment also the respective tip shell element support parts are exchangeable and are therefore connected to the adjacent main body shell element support part, respective interfaces are necessary for firmly fixing these support parts to each other. Again, the tip shell element support parts and the main body shell element support part have standardized, i.e. similar connection interfaces for connecting each tip shell element support part to a respective connection interface of the adjacent main body shell element support part.

In an embodiment, each connection interface is a flange having several bores in which, when the flanges abut each other and the bores are aligned, a bolt is inserted for fixing the shells with a bolt-nut-connection. Thus, the connection is a flange connection. In an alternative the connection is a plug-in connection. The interfaces comprise e.g., pipe-like elements with one element engaging the other, while they are fixed by snap-on or latching connection elements.

The support, the tip shell element support parts or the at least one main body shell element support part are frame constructions built from several beam or rod elements. The support respectively the support parts are a, light-weight, timber framework, which on the other hand is stable enough to carry the weight of the shell means or shell and all building parts respectively the finally produced blade.

BRIEF DESCRIPTION

Some of the embodiments will be described in detail, with references to the following Figures, wherein like designations denote like members, wherein:

FIG. 5 depicts a partial view of an inventive mold having a standardized tip shell element support adapted to receive tip shell elements of different lengths; and FIG. 6 depicts an inventive mold having exchangeable tip shell element support parts adapted to receive respective assigned tip shell elements.

DETAILED DESCRIPTION

Figure 1:
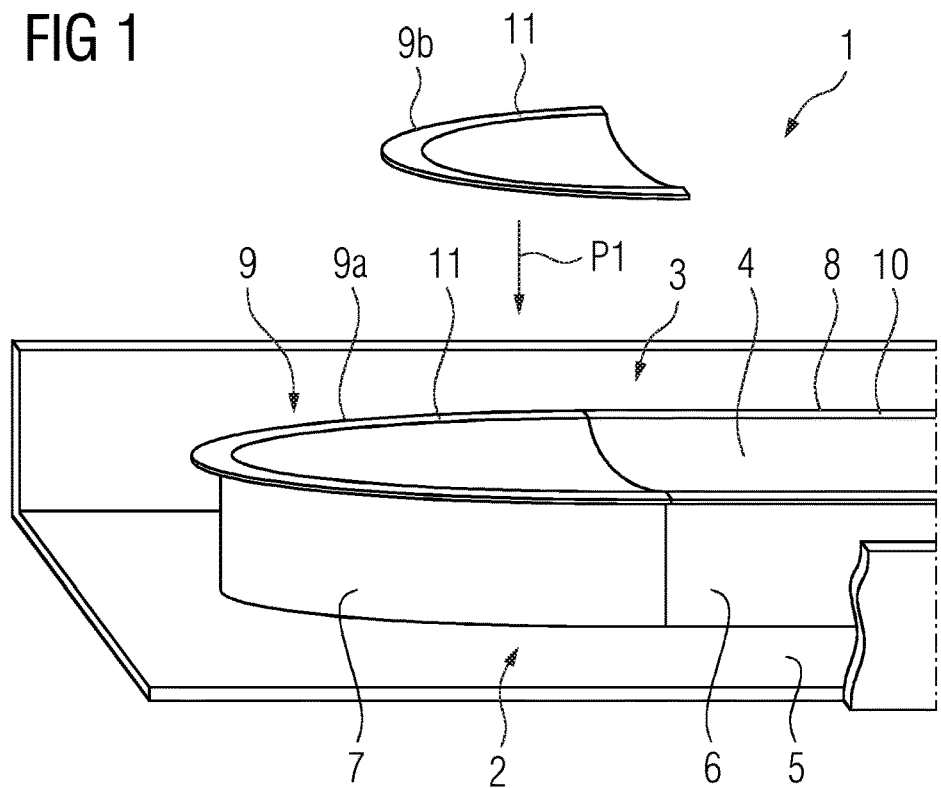
FIG. 1 depicts a principal illustration, in part, of an inventive mold.

FIG. 1 shows an inventive mold 1, adapted for producing a complete wind turbine blade, comprising a support 2 and shell means or shell 3 fixed to the support 2 for accommodating blade building elements to be embedded in the shell means or shell 3 respectively on the upper surface 4 of the shell means or shell 3. The support 2 and the shell means or shell 3 are arranged in a trough 5.

The support 2 comprises one or more main shell element support parts 6. When several main shell element support parts 6 are provided, they are arranged in line and fixed to each other, depending on the length of the blade body part to be produced.

The support 2 further comprises a tip shell element support part 7, which is attached to the adjacent main body shell element support part 6 and which is the end of the support 2.

The support 2 is adapted to receive respectively carry the shell means or shell 3. The shell means or shell 3 itself comprises several shell elements, i.e., at least one or more main body shell elements 8, which are received by the at least one main body shell element support part 6, with the number of main body shell elements 8 depending on the total length of the main body part which is produced by these main body shell elements 8.

Furthermore, the shell means or shell 3 comprises at least two, more tip shell elements 9, two of which are shown in FIG. 1. Arranged on the tip shell element support part 7 is a first tip shell element 9a, which is the longest tip shell element within the set of tip shell elements 9 having different lengths. It extends over the whole length of the tip shell element support part 7.

Also shown is a second tip shell element 9b, which is remarkably shorter than the first tip shell element 9a. As shown by the arrow P1, the tip shell element 9b can be attached to the tip shell element support part 7 in exchange to the tip shell element 9a, which element exchange changes the whole length of the blade part produced with the mold 1 respectively the shell means or shell 3. By simply changing the respective tip shell element 9 it is possible to easily change the length of the mold 1 respectively the shell means or shell 3 in order to adapt it to any changes in the blade design, especially the blade length.

It is to be noted, that the diverse tip shell elements differ in their lengths. In an alternative or in addition it is also possible that they for example differ in their cross-section, which may for example be lower or narrower etc., with the length of the tip shell elements 9 being the same. Also, with these set of tip shell elements it is possible to adapt the mold 1 to any changes in the blade design.

As shown, all shell elements, the main body shell elements 8 and the tip shell elements 9, have a respective rim 10, 11, with which they rest on the respective support part 6, 7, so that it is easily possible to arrange the respective shell element on the support 2.

Figure 2:
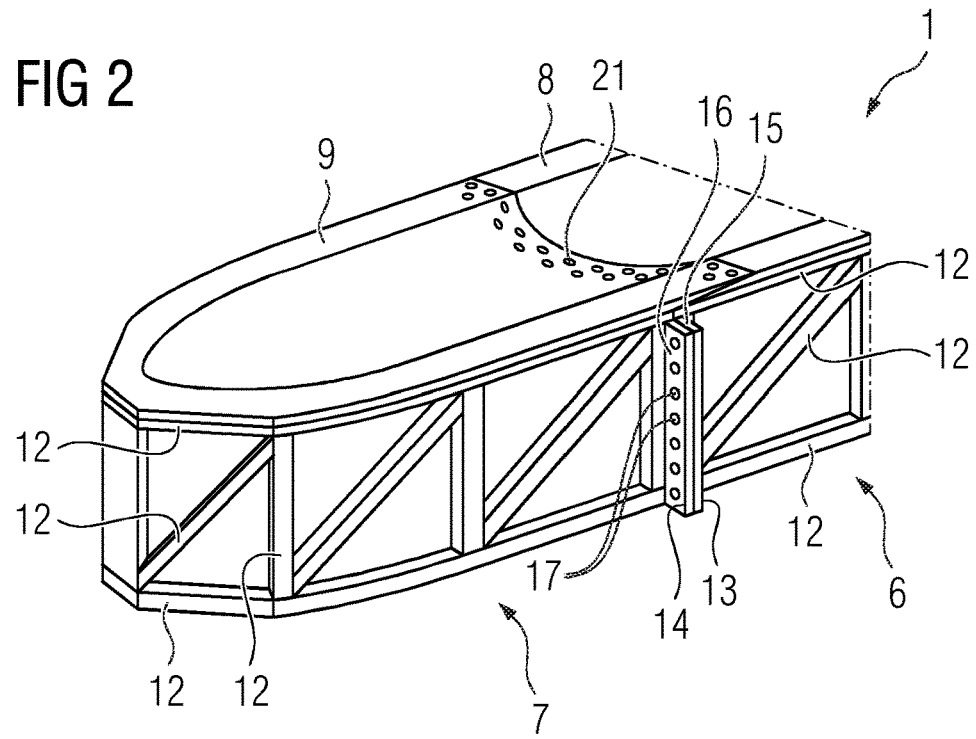
FIG. 2 depicts a part of the inventive mold with a framework support and a tip shell element and a main body shell element.

FIG. 2 shows an enlarged perspective view of the mold 1 with the tip shell element support part 7 and, in part, the adjacent main bodyshell element support part 6. They are all built as a framework made of several beams or rods 12 made of any suitable material. As is shown, the adjacent main body shell element support part 6 and the tip shell element support part 7 comprise respective interfaces 13, 14, here respective flanges 15, 16 having respective bores 29, which are aligned and which receive respective bolt connections not shown in detail in FIG. 2. This allows for a simple but firm connection of this support part 6, 7.

Figure 3:
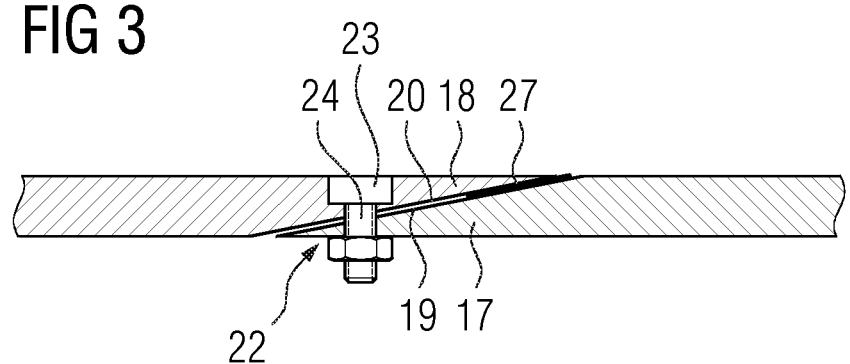
FIG. 3 depicts a principal illustration of a shell element connection according to a first element.

Also shown in this embodiment is the connection of the main body shell element 8 and the tip shell element 9. As shown, they both have respective connection interfaces 17, 18, see also FIG. 3, in the form of slanted surfaces 19, 20, which abut or overlay each other, and which are provided with respective bores 21. The bores 21 are in alignment and receive a respective bolt-nut-connection 22, as shown in FIG. 3. The head 23 of the bolt 24 is sunk in the inner surface of the tip shell element 9, so that it does not interfere with the smooth surface of the blade body part to be built.

The arrangement is such that both the main body shell element 8 and the tip shell element 9 can be arranged only in a defined lateral position, so that, when they are both attached to the support 2 from above, they are automatically aligned in a lateral direction. It is only necessary to bring the respective interfaces 18, 19 above each other, which may also be automatically done when the tip shell element 9 is in place, so that then all bores 21 are automatically aligned.

Figure 4:
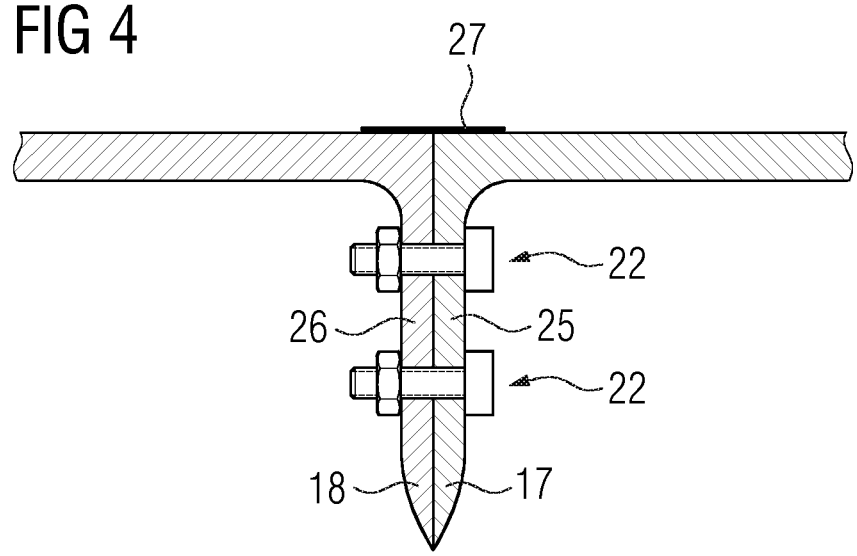
FIG. 4 depicts a principal illustration of a shell element connection of a second embodiment.

FIG. 4 shows another embodiment of the respective interfaces 17, 18 for attaching the main body shell element 8 to the tip shell element 9. Here, the interfaces 17, 18 are respective flanges 25, 26 having respective bores receiving respective bolt-nut-connections 22. Different to the embodiment of FIG. 3, where the respective bolt-nut-connection 22 is vertically arranged, the bolt-nut-connection 22 according to FIG. 4 is arranged in a horizontal direction.

Also shown is the possibility to bring a glue or any other sealing means 27, which may also be a lamination means or laminate, right into the interface zone for sealing this interface slit between the respective shell elements 8, 9.

FIG. 5 shows an embodiment of an inventive mold 1, where the support 2 comprises a tip shell element support part 7 having a length which corresponds to the length of the longest tip shell element 9a (as explained with regard to FIG. 1), while, as shown in FIG. 5, a shorter tip shell element 9b is arranged on the tip shell element support part 7. As clearly shown, the tip shell element support part 7 is much longer than the short tip shell element 9b, but, if need be, the longer or longest tip shell element 9a can be arranged on the tip shell element support part 7 in exchange to the tip shell element 9b without changing anything at the tip shell element support part 7. Thus, the tip shell element support part 7 is a universal support part.

In an alternative, as shown in FIG. 6, where again an inventive mold 1 is shown, it is possible to use a modular support 2. The figure shows the main body shell element support part 6 with the main body shell element 8 arranged on it. It furthermore shows two different tip shell element support parts 7a, 7b. Both are adapted to receive a certain tip shell element 9a, 9b, which also differ in their lengths. The length of the respective tip shell element support part 7a, 7b is adapted to the length of the respective tip shell element 9a, 9b, so that they are perfectly fit to the respective tip shell element support part 7a, 7b. As shown by the arrows P2, it is in this embodiment possible to also exchange the respective tip shell element support part 7 respectively 7a, 7b, when a change of the respective tip shell element 9 respectively 9a, 9b is necessary.

The respective main boy shell elements 8 and the tip shell elements 9 respectively 9a, 9b may be simple shell elements, but they may also be provided with a heating means or heater 28, as shown in FIG. 5. This heating means or heater may be a tube, through which hot water or the like circulates, or it may be a wire for providing an electric resistance heating or the like. Although the heating means or heater 28 is only shown at the respective tip shell elements 9a, 9b, any such heating means or heater 28 may also be provided at the respective adjacent main body shell elements 8. In an embodiment, the heating means or heater 28 of neighbouring shell elements, no matter if it is a tip shell element or a main body shell element, are connected with each other, so that for example a long heating pipe is provided, which extends over the whole length of the shell means or shell 3, or that a respective long electric heating wire is realized extending over the whole length of the shell means or shell 3, so that the respective heating fluid or electrical connection is provided at one certain point for heating the whole shell means or shell 3.

The above depicted various embodiments of an inventive mold are adapted to produce a single complete wind turbine blade. Nevertheless, such a mold setup can also be used for producing only a part of a wind turbine blade in form of a half upper or lower shell. In any embodiment the inventive modular mold setup allows for a simple change of the mold respectively shell design to adapt the mold to certain changes in the blade design, especially changed in the blade length.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A mold adapted for producing at least a part of a wind turbine blade, comprising a support and shell fixed to the support for accommodating blade building elements to be embedded in a resin matrix, wherein the shell comprises at least one main body shell element and several diverse tip shell elements, which are exchangeably fixable to the support,
   wherein the support comprises at least one main body shell element support part and a single universal tip shell element support part for receiving the several diverse tip shell elements, wherein a length of the single universal tip shell element support part corresponds to a length of a longest tip shell element of the several diverse tip shell elements such that each of the several diverse tip shell elements can be attached to the single universal tip shell element support part; or
   wherein the support comprises the at least one main body shell element support part and several diverse tip shell element support parts for receiving a tip shell element, wherein each respective tip shell element support part of the several diverse tip shell element support parts corresponds to a length of an assigned tip shell element of the several diverse tip shell elements, wherein the several diverse tip shell element support parts are exchangeably fixable to an adjacent main body shell element support part of the at least one main body shell element support part;
   wherein each of the several diverse tip shell elements has a standardized connection interface for connecting each respective tip shell element to a respective connection interface of the at least one main body shell element;
   wherein each standardized connection interface comprises a first slanted surface having a first bore and the respective connection interface comprises a second slanted surface having a second bore, wherein, when the first slanted surface abuts the second slanted surface and the first bore and the second bore are aligned, a bolt is inserted for fixing the at least one main body shell element and respective tip shell element with a bolt-nut-connection, wherein a head of the bolt is sunk in an inner surface of the respective tip shell element, and wherein the first slanted surface and the second slanted surface of each standardized connection interface are automatically aligned in a lateral direction when the main body shell element and the single universal tip shell element support part or each of the several diverse tip shell element support parts are arranged in a defined lateral position; and
   wherein the single universal tip shell element support part or each of the several diverse tip shell element support parts have a standardized support connection interface for connecting each respective tip shell element support part to the at least one main body shell element support part, wherein each standardized support connection interface is a flange having several bores, in which, when the flanges abut each other and the bores are aligned, a bolt is inserted for fixing with a bolt-nut-connection, and wherein the bores are automatically aligned when the first slanted surface and the second slanted surface of each standardized connection interface are aligned.

2. The mold according to claim 1, wherein the several diverse tip shell elements vary at least in their length.

3. The mold according to claim 1, wherein the support, the single universal tip shell element support part, or the at least one main body shell element support part are frame constructions built from several beam or rod elements.

4. The mold according to claim 1, wherein at least one of the several diverse tip shell elements includes a heater.

5. The mold according to claim 1, wherein the at least one main body shell element includes a heater.

6. A mold kit for producing at least a part of a wind turbine blade, comprising:
   a support, and
   a shell configured to be fixed to the support for accommodating blade building elements to be embedded in a resin matrix, wherein the shell comprises at least one main body shell element and several diverse tip shell elements, which are exchangeably fixable to the support,
   wherein the support comprises at least one tip shell element support part for receiving the several diverse tip shell elements,
   wherein each of the several diverse tip shell elements has a standardized connection interface for connecting each respective tip shell element to a respective connection interface of the at least one main body shell element,
   wherein each standardized connection interface comprises a first slanted surface having a first bore and the respective connection interface comprises a second slanted surface having a second bore, wherein, when the first slanted surface abuts the second slanted surface and the first bore and the second bore are aligned, a bolt is inserted through the bores for fixing the at least one main body shell element and respective tip shell element with a bolt-nut-connection, wherein a head of the bolt is sunk in an inner surface of the respective tip shell element, and wherein the first slanted surface and the second slanted surface of each standardized connection interface are automatically aligned in a lateral direction when the main body shell element and the single universal tip shell element support part or each of the several diverse tip shell element support parts are arranged in a defined lateral position; and
   wherein the single universal tip shell element support part or each of the several diverse tip shell element support parts have a standardized support connection interface for connecting each respective tip shell element support part to the at least one main body shell element support part, wherein each standardized support connection interface is a flange having several bores, in which, when the flanges abut each other and the bores are aligned, a bolt is inserted for fixing with a bolt-nut-connection, and wherein the bores are automatically aligned when the first slanted surface and the second slanted surface of each standardized connection interface are aligned.

7. The mold kit according to claim 6, wherein the at least one tip shell element support part is a single universal tip shell element support part for receiving the several diverse tip shell elements, wherein a length of the single universal tip shell element support part corresponds to a length of a longest tip shell element of the several diverse tip shell elements such that each of the several diverse tip shell elements can be attached to the single universal tip shell element support part.

8. The mold kit according to claim 6, wherein at least one of the several diverse tip shell elements includes a heater.

9. The mold kit according to claim 8, wherein the at least one main body shell element includes a heater.

* * * * *